United States Patent
Lanz et al.

(10) Patent No.: US 6,953,184 B2
(45) Date of Patent: Oct. 11, 2005

(54) ROTARY DAMPER ASSEMBLY (75) Inventors: Douglas C. Lanz, South Elgin, IL (US); Gary R Ashurst, Aurora, IL (US); Thomas J. Daven, St. Charles, IL (US)

(73) Assignee: Robertshaw Controls Company, Richmond, VA (US)

( * ) Notice: Subject to any disclaimer, the term of this patent is extended or adjusted under 35 U.S.C. 154(b) by 291 days.

(21) Appl. No.: 10/107,411

(22) Filed: Mar. 28, 2002

(65) Prior Publication Data

US 2002/0139950 A1 Oct. 3, 2002

Related U.S. Application Data (60) Provisional application No. 60/279,664, filed on Mar. 30, 2001.

(51) Int. Cl.[7] ............................................. F16K 31/12
(52) U.S. Cl. .................... 251/129.11; 251/77; 251/344; 251/345
(58) Field of Search ................................. 251/208, 343, 251/344, 345, 129.11, 129.12, 129.13, 77, 129.19; 137/15.17, 454.2, 454.5, 454.6; 310/90, 91

(56) References Cited

U.S. PATENT DOCUMENTS

| | | | | |
|---|---|---|---|---|
| 4,169,491 A | * | 10/1979 | Bajka | 137/625.47 |
| 4,425,813 A | * | 1/1984 | Wadensten | 310/91 |
| 4,431,161 A | * | 2/1984 | Miller et al. | 251/129.11 |
| 4,909,212 A | * | 3/1990 | Minowa et al. | 251/129.11 |
| 5,242,150 A | * | 9/1993 | Shiffler et al. | 251/208 |
| 5,877,572 A | * | 3/1999 | Michaels et al. | 310/91 |
| 6,240,735 B1 | * | 6/2001 | Kolson et al. | 62/187 |

* cited by examiner

*Primary Examiner*—Eric Keasel
(74) *Attorney, Agent, or Firm*—Reinhart Boerner Van Deuren P.C.

(57) ABSTRACT

An apparatus for regulating flow of fluid received from a fluid source has an inner cylinder with inlet and outlet apertures, and an outer cylinder that also has inlet and outlet apertures. The inner cylinder is nested within the outer cylinder and rotatable with respect to the outer cylinder to control an amount of registration of the outlet apertures of the inner and outer cylinders to regulate flow of fluid through the apparatus. A motor is coupled to the inner cylinder by an axially symmetrical motor output shaft and mating recess of the inner cylinder, with crush ribs to eliminate axial play. The motor mounting arrangement is configured to mount the motor to the outer cylinder such that the motor floats within the motor mounting arrangement.

21 Claims, 11 Drawing Sheets

Motor Drive Circit Schematic With Damper in OPEN Steady State

FIG. 7b

Motor Drive Circit Schematic With Damper in CLOSED Steady State

FIG. 7c

Motor Drive Circit Schematic With Damper in OPEN Steady State

ROTARY DAMPER ASSEMBLY

RELATED APPLICATION

This application claims priority from Provisional Application Ser. No. 60/279,664 filed on Mar. 30, 2001 entitled: "ROTARY DAMPER ASSEMBLY", the entire disclosure of which is hereby incorporated by reference herein.

FIELD OF THE INVENTION

This invention relates to the field of pneumatic flow dampers, and more particularly to flow dampers for use in the field of refrigeration devices.

BACKGROUND ART

Refrigeration equipment for providing cold storage of articles, such as residential refrigerators for storing food items, include several different temperature zones, or compartments. Common among these are a freezer compartment for maintaining sub-freezing temperatures, and a fresh food compartment for maintaining a cool temperature for fruit and vegetable produce. The known method of regulating the different compartment temperatures is to use a compressor, evaporator, and fan to provide sub-freezing air to the freezer compartment, and to bleed some of this air to cool the fresh food compartment, as necessary, to maintain the fresh food temperature between freezing and room ambient.

There are several known prior art control methods and systems for achieving this. The least cost method is to use a manually operated damper in the bleed line and a thermostat in the fresh food compartment. The refrigerator user then adjusts the damper position and the thermostat set point temperature to selected values. The thermostat then actuates the refrigeration system (i.e. compressor and evaporator fan) to control the cool air flow to the freezer in response to the actual fresh food compartment temperature being above and below the thermostat set point. The freezer temperature then is dependent on the fresh food compartment set point temperature and the damper position. This has several drawbacks, including the instability of the freezer temperature, as well as longer operating cycle times of the compressor and evaporator fan. This results in higher operating costs due to the lower electrical efficiency of the refrigeration system.

A less common, but more expensive type control system used in "high performance" refrigerators (approximately 15% of the refrigerators produced in the United States) is to use a freezer compartment thermostat to control actuation of the refrigeration system and to modulate the cool air flow to the fresh food compartment with a damper which is automatically positioned by a refrigerant charged bellows. The bellows expands and contracts in response to the fresh food compartment temperature, and positions the damper in a manner to maintain the fresh food compartment temperature within a user selected temperature range. This provides direct control of the freezer temperature, and since the bellows temperature characteristics are predictable, this system provides more accurate temperature control of both compartments.

Despite the improved efficiency of the more expensive system, the controlled temperature of both compartments still varies over a substantial range of temperatures. This is due to the passive nature of both of these control functions, which is characterized by greater operating tolerances as well as limited response time. Alternatively, the growing use of microcontroller and microprocessor based controls in residential appliances now makes them cost effective for use in residential refrigerators. They provide increased control accuracy, faster response, and lower refrigeration cycle times, all of which result in higher efficiency and lower operating costs to the consumer.

Within these electronic control type systems, however, there remains the need for mechanical damper assemblies. To further improve the operating efficiency of the electronic controls, these mechanical damper assemblies must preferably be capable of operating in a gated manner; i.e. in an open/closed sequence at a given duty cycle, as determined by the electronic control. The ideal damper assembly therefore must itself be capable of fast response as well as efficient air flow characteristics.

A rotary damper assembly resolves many of these concerns. In such an assembly, an inner cylinder is provided within an outer cylinder (or housing) and is rotatable within this outer cylinder. The inner cylinder contains an inlet aperture and an outlet aperture, and the outer cylinder also contains an inlet aperture and an outlet aperture. The inner cylinder, which is nested within the outer cylinder, is rotated by a motor to adjust the registration of the outlet apertures of the inner cylinder and the outer cylinder. When the outlet apertures are fully registered, the damper is considered fully open and the maximum flow rate through the damper is provided. When the inner cylinder is rotated to a position in which the outlet apertures are fully deregistered, the damper is in a closed position in which a minimum flow rate of fluid is provided.

While such a rotary damper overcomes many of the concerns in the prior art, there may still be an undesirable amount of air leakage when the damper is in the closed position. Furthermore, it is desirable to increase the reliability of the rotary damper.

SUMMARY OF THE INVENTION

There is a need for a rotary damper assembly that reduces the air leakage in the damper, while improving the reliability of the damper. These and other needs are met by embodiments of the present invention which provide an apparatus for regulating the flow of fluid received from a fluid source, comprising, an inner cylinder with an inlet aperture and an outlet aperture. An outer cylinder is provided with an inlet aperture and an outlet aperture. The inner cylinder is nested within the outer cylinder and is rotatable with respect to the outer cylinder to control an amount of registration of the outlet apertures of the inner cylinder and outer cylinder. This regulates the flow of fluid through the apparatus. A motor is coupled to the inner cylinder and is actuable to rotate the inner cylinder with respect to the outer cylinder. A motor mounting arrangement is provided that is configured to mount the motor to the outer cylinder such that the motor floats within the motor mounting arrangement.

In another aspect of the invention, a rotary damper assembly is provided that comprises an inner cylinder with: an inlet aperture at one axial end, a sidewall with an outlet aperture in the sidewall, and a motor coupling element at another axial end. The rotary assembly includes an outer cylinder with: an inlet aperture at one axial end, and a sidewall with an outlet aperture in the sidewall. The inner cylinder is nested and rotatable within the outer cylinder to control an amount of registration of the outlet apertures of the inner cylinder and the outer cylinder to thereby regulate flow of fluid through the apparatus. The motor is engaged in a driving manner with the motor coupling element. A motor mounting arrangement is provided that includes mounting bosses on the outer cylinder. Each mounting boss has a bore configured to receive a fastener. The motor mounting arrangement also includes a motor housing on the motor, this motor housing having a flange with motor mounting holes with a first diameter. The motor housing is mounted on the mounting bosses. Fasteners extend through the motor mounting holes and into each bore. These fasteners have a second diameter and a fastener head. The first diameter is greater than the second diameter such that the motor housing is coupled to the outer cylinder with radial play. The fasteners protrude from the bores with a clearance between the fastener head and the flange such that the motor housing is coupled to the outer cylinder with axial play.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 14 is an end view of the motor output shaft of FIG. 9a.

BEST MODE FOR CARRYING OUT THE INVENTION

The present invention addresses problems related to the air leakage from a rotary damper that occurs when the damper is in the closed position, as well as the reliability of the design. The leakage of the rotary damper may be improved by reducing the tolerances so as to provide closer-fitting cylinders. However, the alignment of all components then become much more critical to the design. Due to the various manufacturing processes used for the components of the assembly, allowances need to be made to address a worst-case tolerance stack up scenario. The present invention minimizes the effect of misalignment in the inner cylinder by providing, in certain embodiments, a motor that is allowed to float at its mounting points. Hence, the assembly allows the motor to float a small amount both radially and axially. The relieving of the axial force prevents the rubbing together of axial faces and production of a squeaking noise during normal operation. Also, the axial clearance generated from floating the motor removes the potential for squeaking, while not greatly affecting the leakage of the unit. Further features also improve the reliability of the rotary damper of the present invention.

Figure 1:
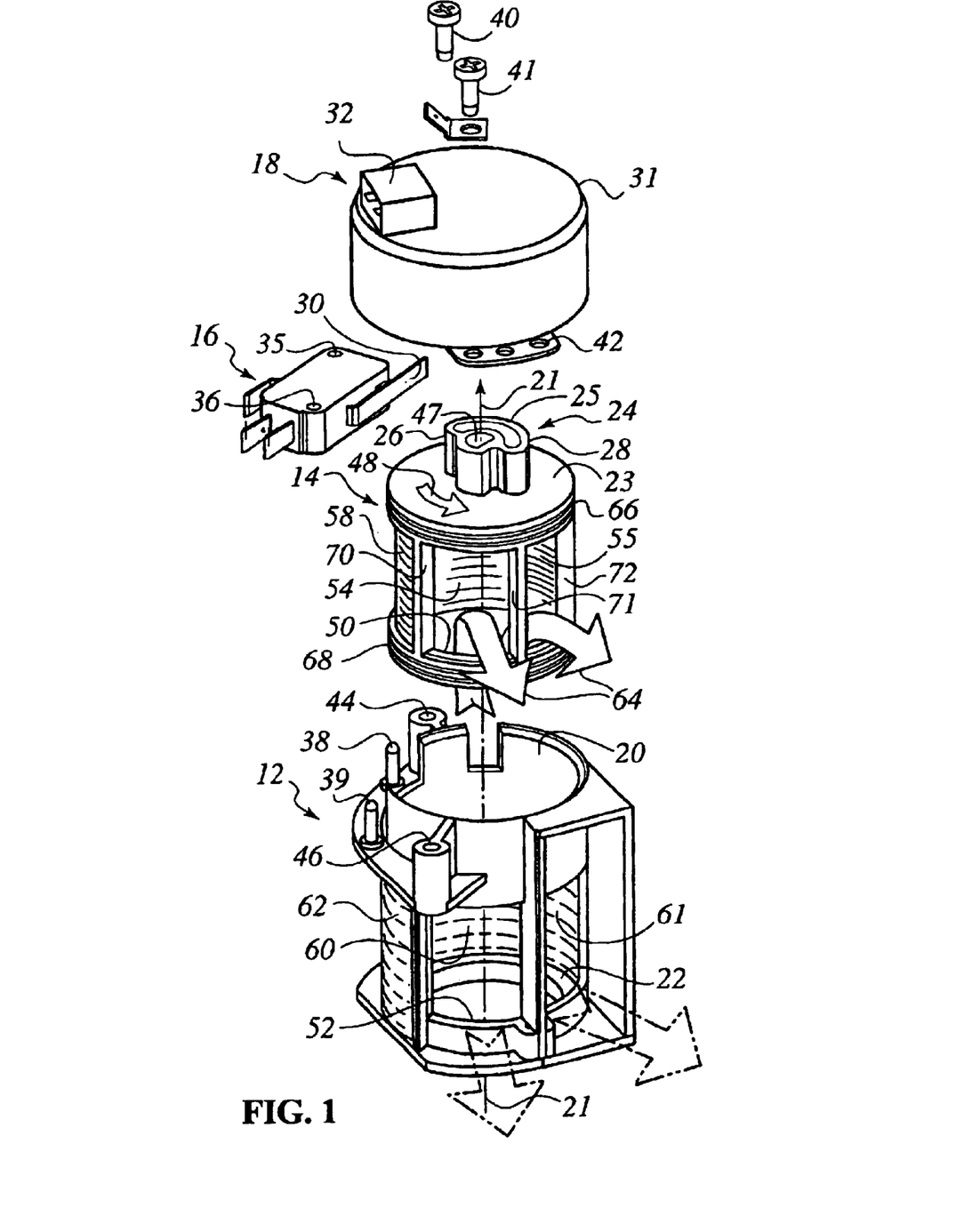
FIG. 1, is an exploded, perspective view of an embodiment of the rotary damper assembly of the present invention.

FIG. 1 is an exploded, perspective illustration of the rotary damper assembly 10 of the present invention. The major elements of the assembly include an outer cylinder duct 12, an inner cylinder 14, a position switch 16, and a source of electromotive power 18. The inner cylinder 14 is adapted to be inserted within the hollow interior 20 of the outer cylinder 12 in a nested manner which permits relative axial rotation of the cylinders about a common longitudinal axis 21. A radial pedestal 22 within the interior 20 of the outer cylinder 12 provides a rest for the inner cylinder 14.

In a best mode embodiment, the outer cylinder duct 12 is fixed in position (i.e. stationary) relative to the inner cylinder 14. To identify its rotational position within the outer cylinder 12, one axial end 23 of the inner cylinder 14 includes a position annunciator device 24 having a contoured surface 25 which is positioned radially from the longitudinal axis 21 so as to rotates with the inner cylinder 14. The contoured surface 25 includes surface indicia which may be arranged in a selected scale along the contour to identify selected angular ranges of rotation of the inner cylinder, so as to allow for the detection of the inner cylinder's position relative to the outer cylinder. The purpose is to provide sensed feedback of the inner cylinder position.

In connection with the annunciator device it is important to recognize that the present rotary damper assembly is capable of different operating modes. As an example it may be desired in precision control applications to closely modulate the fluid flow. As understood by those skilled in the art this may be achieved by closed loop control of the inner cylinder position so as to have the cylinder "dither" about a position related to a degree of overlap of the outlet apertures which provide an average flow in satisfaction of the control algorithm. In this application it would be necessary to provide a reasonably graduated scale of indicia on the surface 25 to provide sufficient position resolution.

In a best mode embodiment, however, the damper assembly is operated in a gated mode in which the relative position of the nested cylinders is bistable, (i.e. positioned alternately in a minimum flow and a maximum flow state). The rotary damper assembly performance is governed by a control system (not shown) which actuates the damper in dependence on a control objective, such as controlling the average temperature in a compartment by modulating the cool air flow through the assembly into the compartment. It performs this control by gating the damper between the maximum and minimum flow state positions at the periodic frequency necessary to provide the required average temperature.

In the one embodiment, therefore, the contoured surface 25 is provided in a simple CAM contour, with only two endpoint surface indicia 26, 28 corresponding to a related one of the minimum flow and maximum flow states. In the final assembly 10, the position switch 16 is mounted in proximity to the position annunciator 24 in a manner which causes the indicia 26, 28 to make mechanical contact with a reed element 30 of the switch 16 in the course of inner cylinder rotation. As more fully described hereinafter, each such contact "announces" an associated rotational position of the inner cylinder.

Figure 7A:
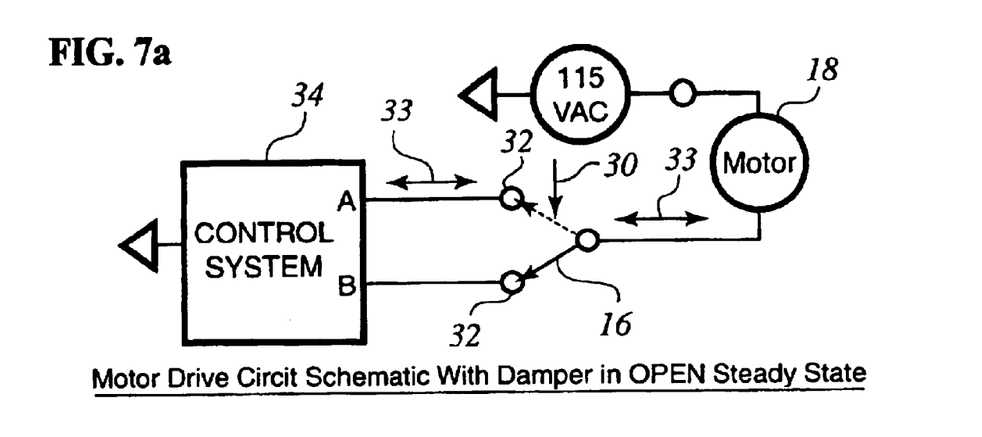
FIG. 7, illustrations (A)–(C), are schematic diagrams used in the description of operation of the rotary damper assembly embodiment of FIG. 1.
Figure 7B:
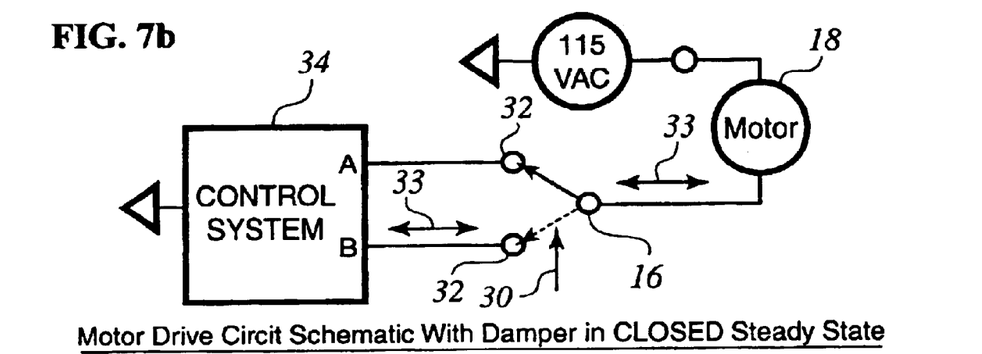
Figure 7C:
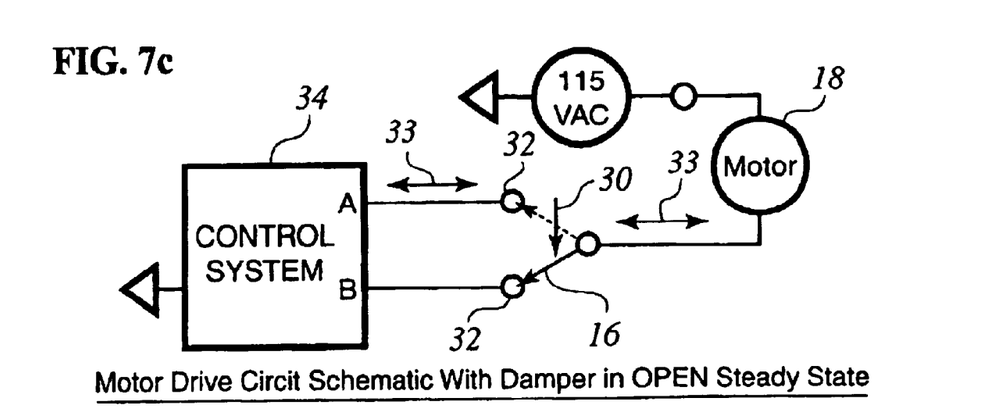

The source of motive power 18 (FIG. 7) is housed within a casing 31. In the certain embodiments the source is an electric motor, such as a 115 volt AC (alternating current) type known in the art (not shown). The motor is actuated by having the control system apply the AC voltage signal to one of alternating two pins in a connector 32 located on the casing 31. FIG. 7 is a series of three schematic illustrations (A.) through (C.) which demonstrate this gated control. In certain embodiments of a damper assembly to be used for commercial refrigeration applications, the inner cylinder 14 rotates in a selected, single direction; whether clockwise or counterclockwise.

Referring to FIG. 7, illustration (A.), the electric motor 18 is actuated by a current signal 33 from the 115 VAC source. The current signal path is completed by the control system 34 through line A of connector 32 and the switch 16 (shown dashed) until the annunciator device 24 (FIG. 1) rotates to a point where one of its associated endpoints (26, 28 FIG. 1) comes in contact with, and depresses, the reed element 30 (FIGS. 1 and 7). This repositions the switch 16 to contact 32 B, opening the current flow path and de-energizing the motor at one of the two damper state positions. For purposes of description it is assumed that it is in the "OPEN steady state".

Illustration (B.) assumes that the motor is actuated to slew the inner cylinder to its CLOSED position by having the control system provide a closed path for the current 33 through contact 32 B and switch 16 (shown in dashed format to depict its initial position) until the opposite one of the annunciator endpoints (26, 28, FIG. 1) contacts the reed 30 and moves switch 16 to contact 32 A. This stops the motor with the damper assembly in the CLOSED state. Illustration (C.) shows the current path for actuation of the motor to cycle the damper back to the OPEN position. As is evident, the cycle is continually repeated to modulate the fluid flow through the damper assembly as necessary to maintain the control system temperature setpoint in the temperature controlled compartment.

Referring again to FIG. 1, in this embodiment of the assembly 10, the position switch 16 includes mounting holes 35, 36 which allow it to be removably mounted on the outer cylinder duct assembly 12 on pins 38, 39. The combination of the nested cylinders, and the switch 16 are bound in place by securing the casing 31 to the outer cylinder duct 12 by fitting fasteners 40, 41, such as screws, through flanges in the casing, such as the flange 42, and fastened into anchors 44, 46 on the duct assembly 12. Although not shown in the FIG. 1 illustration, in assembly the drive shaft of the source of motive power fits into a recess 47 formed in the annunciator 24, so as to allow the source to engage and rotate the inner cylinder. It should be understood by those skilled in the art, that although the above-described embodiment causes the inner cylinder 14 to be slewed in a constant direction between its steady state positions, in general the inner cylinder is rotatable in alternating (clockwise and counter clockwise) as figuratively illustrated by the arrow 48.

The utility of the present rotary damper assembly is in regulating the flow volume of pneumatic fluid from a fluid source, such as cool air from the freezer compartment of refrigeration apparatus, to a destination, such as the fresh produce compartment, in response to a desired control function, such as a fresh food set point temperature. The fluid from the source is received by the nested cylinders through axially located inlet apertures, including a first inlet aperture 50 at the end of inner cylinder 14 which is opposite the annunciator 24, and a second inlet aperture 52 at an axial end of outer cylinder 12 opposite to the end receiving the inner cylinder 14.

The fluid is discharged from the assembly 10 through outlet apertures formed in the sidewall of each of the cylinders. These include a first outlet aperture, with sections 54, 55, formed in sidewall 58 of the inner cylinder 14 and a second outlet aperture with sections 60, 61 formed in the sidewall 62 of outer cylinder 12. The area of each outlet aperture is application dependent, and is proportional to the maximum volume of fluid which must flow through the assembly at any instant of time. In the best mode embodiment the outlet aperture areas are shown sectioned for structural support purposes, which may not be required for all applications.

The maximum arc formed by the outlet apertures (the combined sections) along the circumference of each cylinder sidewall is 180 degrees. Preferably, the sum arc of both outlet aperture sections is less than 160 degrees to provide an angular range of inner cylinder positions which ensure that there is no overlap between the first and second outlet aperture areas. This is the minimum flow condition, which is ideally zero but due to leakage through the nested sidewalls may have some value. Alternatively, when the inner cylinder 14 is rotated to provide full registration of the inner cylinder aperture sections 54, 55 with those 60, 61 of the outer cylinder, there is a maximum flow of the fluid (shown figuratively by the arrows 64.)

To minimize fluid leakage between the nested cylinder sidewalls in the minimum flow state, the inner cylinder may be provided with fluid sealing members. These include circumferential sealing members disposed in annular grooves 66, 68 formed along the circumference of each of the inner cylinder's axial ends and, electively, along the radial pedestal 22 of the outer cylinder 12. These circumferential sealing members limit axial fluid flowing between the cylinder sidewalls, and may comprise O-rings formed from material which is deemed suitable by those skilled in the art both for use with the particular fluid as well as durable with rotation of the inner cylinder in the nested environment. A lesser cost alternative, which is application specific, may be the use of a grease lubricant deposited in the in the annular grooves. This may be particularly true for a damper assembly used in and around refrigeration equipment where the lubricant maintains a higher degree of viscosity due to the cooler temperature. This lubricant may be any suitable known type, and preferably is a synthetic hydrocarbon oil, such as NYE Flouro Carbon Gel 807.

To limit the radial flow of fluid within the interstice of the nested sidewalls, longitudinal sealing members 70–72 are used. These members are in the form of ribs disposed along the length of the cylinder sidewall, which also provide structural support and rigidity to the inner cylinder. In the best mode embodiment of a rotary damper assembly for use in consumer refrigerators, where cost is a consideration, the outer and inner cylinders 12, 14 are molded polystyrene structures. Preferably the cylinders are injection molded from a high impact polystyrene (HIPS), such as API545-21 manufactured by American Polymers, Inc., using known processes. The rib sealing members 70–72 may then be molded directly into the cylinder structure. The ribs provide friction contact with the inner surface of the outer cylinder sidewall to provide sufficient fluid sealing, while not adversely affecting the rotatability of the inner cylinder. If deemed necessary by those skilled in the art, silicon-based material additives may be added to the HIPS to improve lubrication.

As described above, the applied use of the rotary damper assembly configuration described in this embodiment is to its use in gated operation in which the parent control system alternately commands the damper assembly to gate full open (maximum flow, with substantially full registration of the nested cylinder outlet apertures) to full closed (minimum flow, with no overlap of any of the outlet aperture areas). The bistable states of the assembly in each of these full open and full closed states is illustrated in the following Figures, in which common reference numerals are used to denote common elements among Figures.

Figure 2:
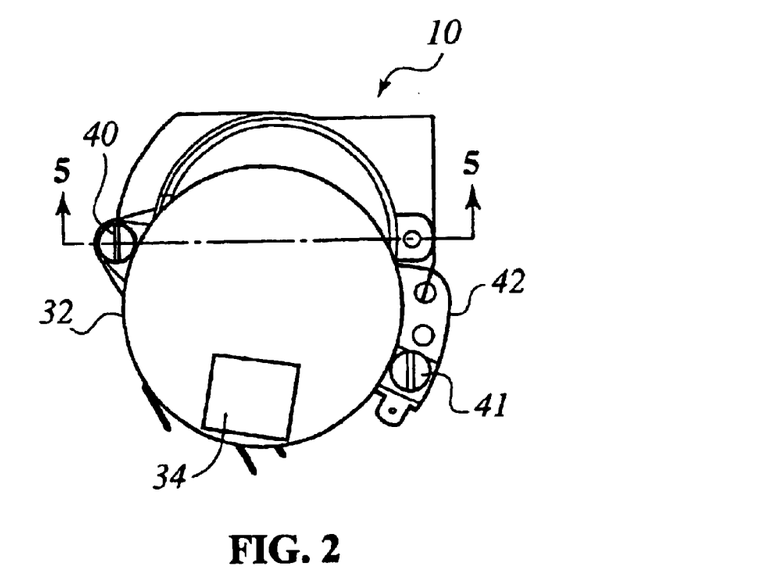
FIG. 2, is a plan view of the assembly of FIG. 2.
Figure 3:
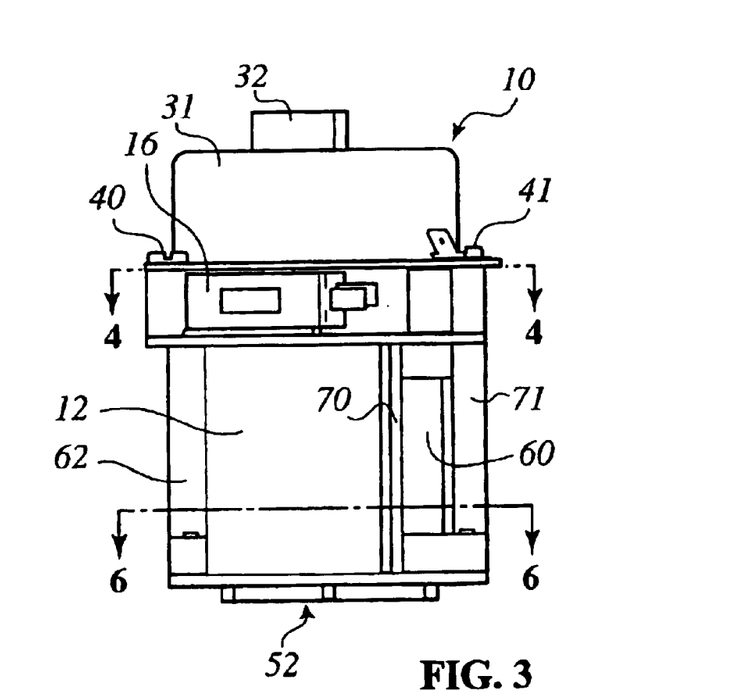
FIG. 3, is an elevation view of the assembly of FIG. 1.
Figure 4:
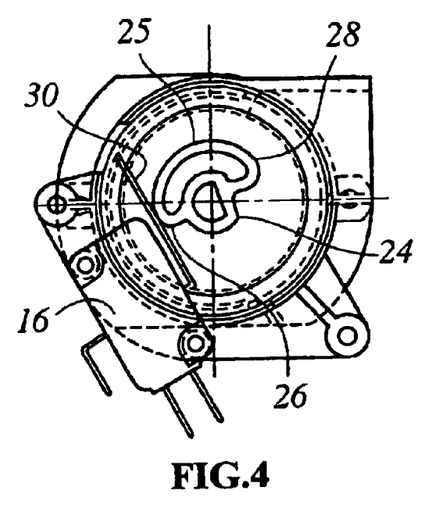
FIGS. 4 and 4A are plan views of the radial section taken along the line 4—4 of FIG. 3, each illustrating a different operating position of the rotary damper assembly of FIG. 1.
Figure 5:
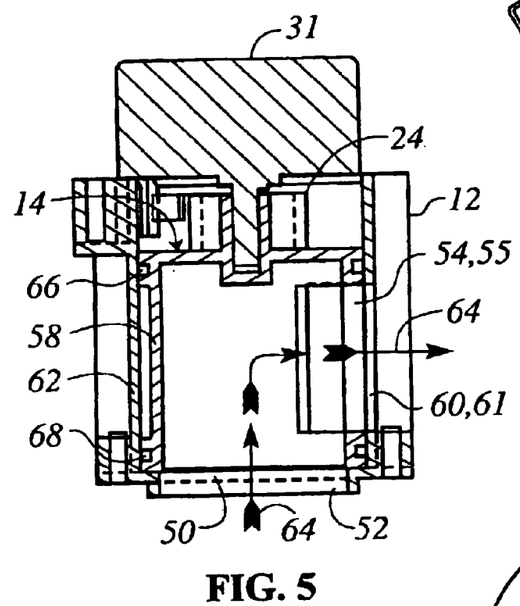
FIGS. 5 and 5A are elevation views taken along the line 5—5 of FIG. 2, each illustrating a different operating position of the rotary damper assembly of FIG. 1.
Figure 6:
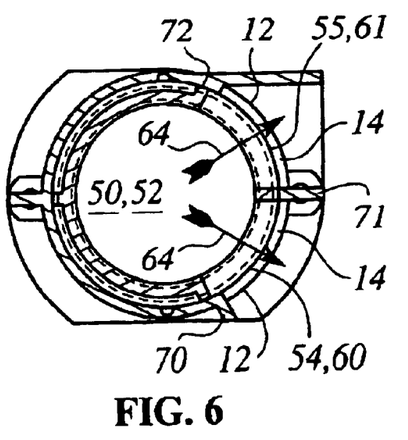
FIGS. 6 and 6A are plan views of the radial section taken along the line 6—6 of FIG. 3, each illustrating a different operating position of the rotary damper assembly of FIG. 1.

FIGS. 2 and 3 are plan and elevation views, respectively, of the top and side of the assembled rotary damper assembly of FIG. 1, and are used here to reference the sectioned assembly views illustrated in FIGS. 4–6. FIG. 5 is a sectioned elevation taken along the line 5—5 of FIG. 2, and illustrating the full open state of the rotary damper assembly 10 which is coincident with full, or maximum registration of the first outlet apertures sections 54, 55 of the inner cylinder 14 with the second outlet aperture 60, 61 of the outer cylinder 12. This is the maximum flow condition in which substantially the full volume of fluid flow 64 received through the first and second inlet apertures 50, 52 exits through the registered outlet apertures.

FIG. 4 is a radial section taken along the line 4—4 of FIG. 3, and it illustrates the position of the position annunciator device 24 at the full open state illustrated in FIG. 5. The endpoint 26 of the contoured surface 25 is in contact with the reed element 30 of the switch 16. In response to the contact the reed element switched the throw position of the single pole, double throw switch 16 thereby deactivating the motive source 18 and stopping the inner cylinder at the end position. FIG. 6 is a radial section taken along the line 6—6 of FIG. 3, and it illustrates the coincident relative position of the first and second outlet aperture sections 54, 55 and 60, 61, respectively, in the full registered position, or the maximum flow state.

Figure 4A:
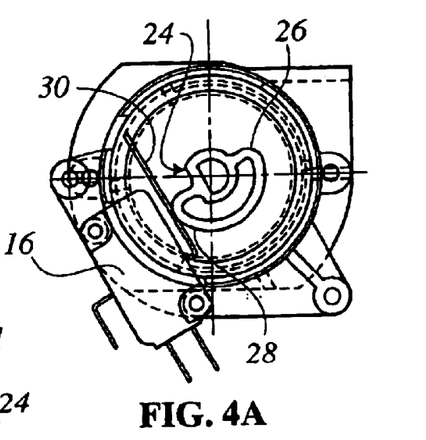

In response to a command signal, which in the present gated mode embodiment is a 115 volt signal applied to the opposite throw position of the switch 16, as described hereinbefore with respect to FIG. 7. In the present embodiment the inner cylinder rotation is in the counterclockwise direction until the opposite end point 28 of the annunciator 24 strikes the reed 30 of the switch, as shown in FIG. 4A. The switch changes states, deactivating the motor and stopping rotation of the inner cylinder at a position corresponding to the fully closed, minimum flow, non-registration state of the outlet apertures.

Figure 5A:
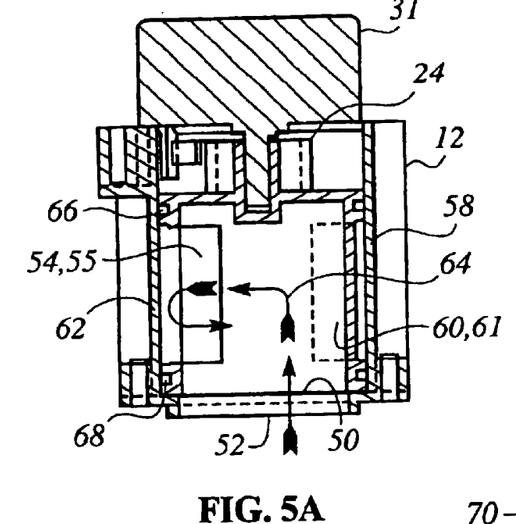
Figure 6A:
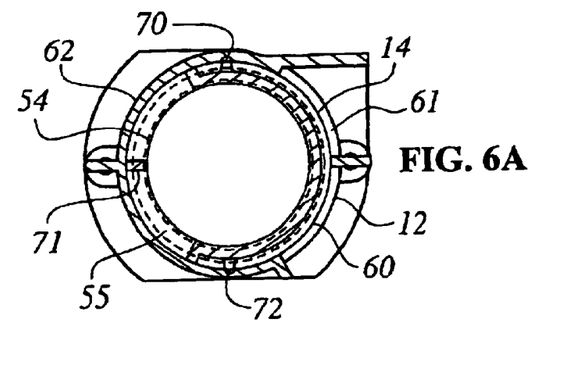

FIGS. 5A and 6A illustrate the opposing positions of the first and second outlet aperture sections 54, 55 and 60, 61, respectively, in the non-registered position, or minimum flow state. As seen the fluid flow 64 is blocked and, with the exception of a minimal leakage flow past the sealing members the flow to the temperature controlled compartment (the fresh produce compartment) is reduced to a minimum; typically 5% or less, and ideally zero. As a result of the ability of the rotary damper assembly to quickly slew from its full opened to full closed positions, the fresh food compartment temperature is quickly lowered to the fresh food compartment set point temperature with little or no over run of the fresh food compartment set point temperature.

The rotary damper assembly of the present invention has several unique features which provide improved performance, while reducing the cost to manufacture and maintain. Since the damper is designed to operate rotationally it is not necessary to convert rotational motion of a motor to linear motion to slide or push a damper door as is done with prior art motorized refrigeration dampers. This results in higher efficiency, less parts, smaller size, and a simpler design that is easier to assemble. The rotational motion may be unidirectional, thereby eliminating the functional parts required to otherwise produce oscillating motion. Finally, the ratio of the permitted flow area of the outlet apertures to the overall size of the assembly is significantly higher than linear type dampers since there is no need to convert rotational motion of the motor into linear motion to slide a damper door.

There are two potential primary leakage paths in the embodiments of the rotary damper described in FIGS. 1–7. As cold air enters the damper through the axial opening, it can migrate to the sidewall aperture of the inner cylinder, traveling between the inner cylinder and the outer housing, until it reaches the sidewall aperture of the outer housing, where the air can then enter the temperature controlled compartment. Another leakage path is the migration of cold air between the mating axial faces of the inner cylinder and outer housing, near to the location where air enters the damper. Although rubber O-rings are possible as a solution, this solution is relatively costly. Also, when the cylinder has a relatively large axial movement in the longitudinal direction, in order to address tolerance stack up of the damper and motor assemblies, a leakage path may be created. For example, when the inner cylinder axial face is separated from the outer housing axial face, a leakage path is created. Hence, the air may flow between the inner cylinder and outer housing and through the outlet aperture of the outer housing.

In order to address these concerns, the diametric clearances between the inner cylinder and outer housing are reduced in preferred embodiments in an effort to reduce the amount of circumferential air leakage when the damper is in the closed position. Although sufficient clearances existed between the inner cylinder and outer housing such that the inner cylinder would not be subjected to a binding condition when all component tolerances where in worst case condition, circumferential air leakage could still occur. By reducing the clearances between the inner cylinder and outer housing, as provided in embodiments of the present invention, it can still be ensured that the inner cylinder and outer housing will not cause interference with one another if both the inner cylinder and outer housing are at the extremes of their tolerance ranges. Other measures taken, and described below, mitigate the effects of tolerance stack up for the other components caused by this reduction in the clearances between the inner cylinder and outer housing.

Figure 8A:
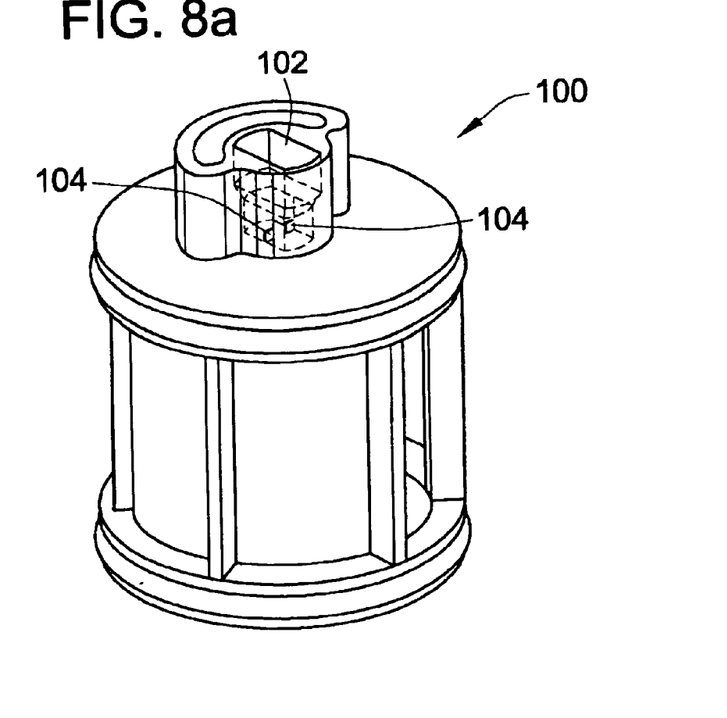
FIG. 8A is a perspective view of an inner cylinder constructed in accordance with an embodiment of the present invention.
Figure 8B:
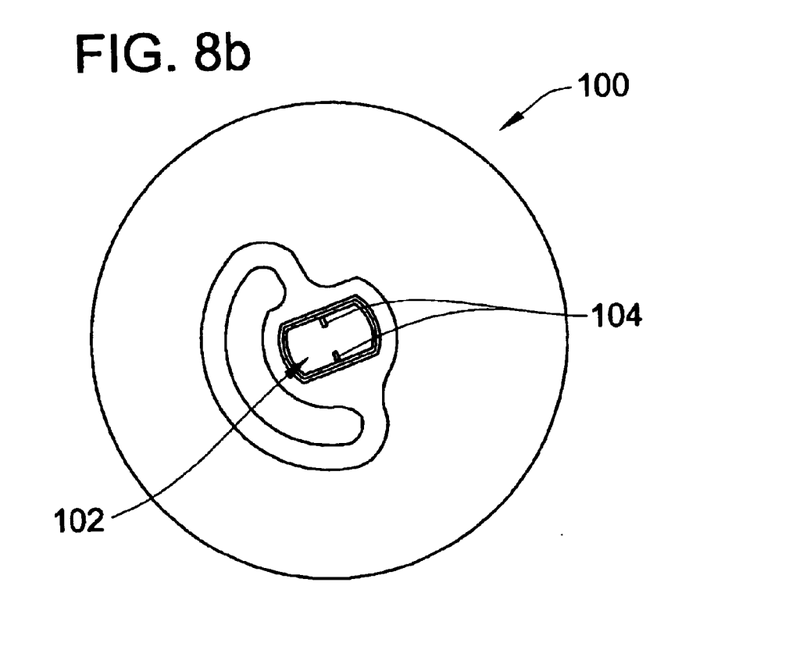
FIG. 8B is a top view of the inner cylinder of FIG. 8A in accordance with an embodiment of the present invention.
Figure 15:
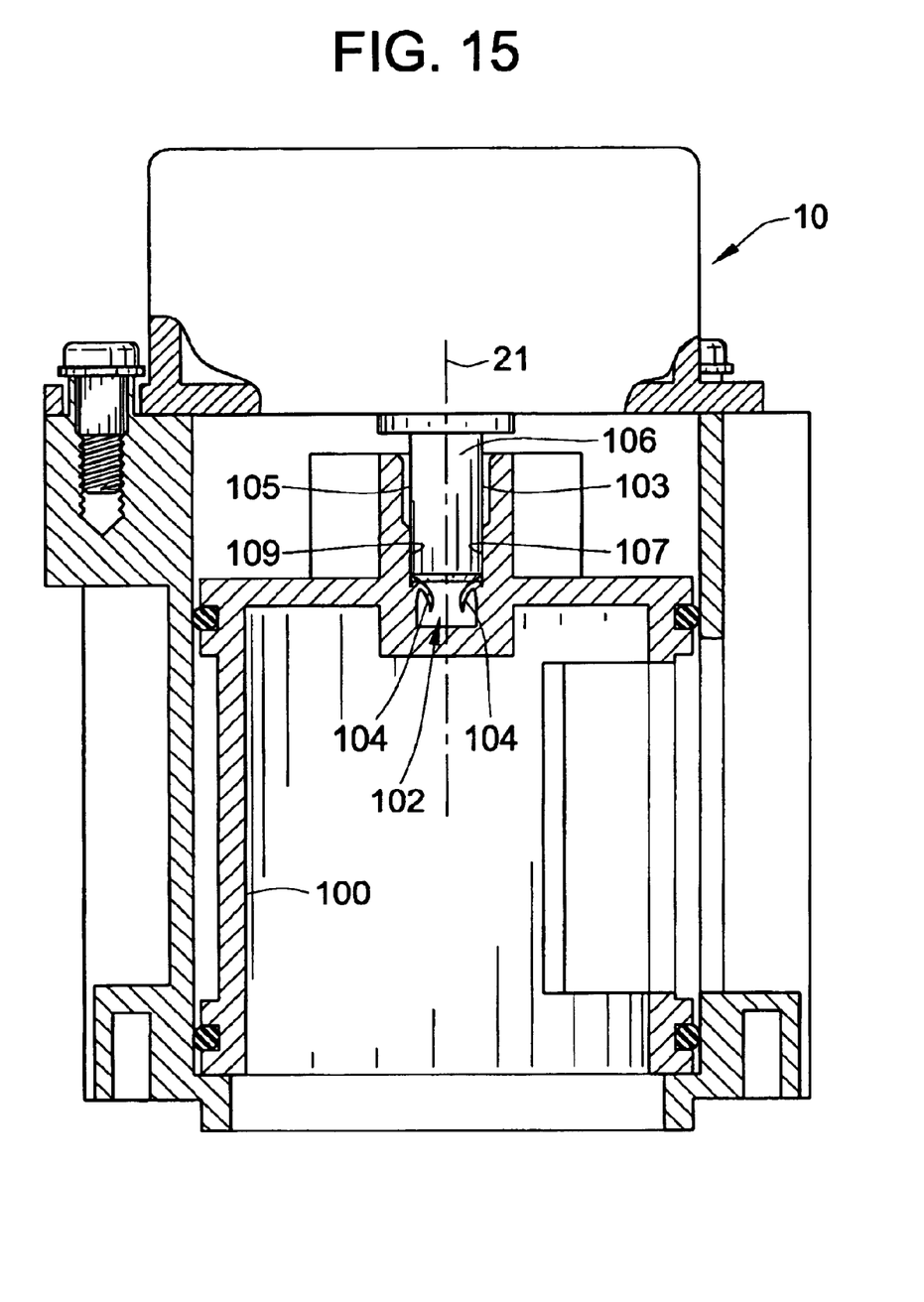
FIG. 15 is a partial cross-section view of an exemplary embodiment of a rotary damper assembly, according to the present invention, showing the manner in which crush ribs according to FIG. 9 are deformed to remove axial play of the motor output shaft during installation of the motor.

In an effort to reduce leakage through the rotary damper, a crush rib may be provided in certain embodiments, to eliminate axial clearance between the inner cylinder and outer housing during assembly. FIG. 8A depicts a perspective view of an inner cylinder 100 constructed in accordance with an embodiment of the present invention. For the following description, many aspects of the rotary damper assembly are the same as in the embodiments in FIGS. 1–7. For example, the inner cylinder 100 corresponds in many respects to the inner cylinder 14. The differences will be described with respect to FIGS. 8–12B. The inner cylinder 100 includes a recess 102 which may form a keyway. The recess 102, also shown in top view in FIG. 8B, has crush ribs 104 extending along the sides of the recess 102. The crush ribs eliminate axial clearance between the inner cylinder 100 and the outer housing (cylinder) 12. The thin-wall crush rib 104 is made of the same material as the recess, such as described earlier. The crush ribs 104 are positioned so that they are permanently deformed within the assembly when the motor 18 is installed. This ensures that the adjoining axial faces of the inner cylinder 100 and the outer housing 12 are held together, dramatically reducing the air leakage path between them. The thin wall rib design addresses the full range of tolerance stack up of the components in the longitudinal direction. The crush ribs 104 exist at the bottom of the recess 102, and in the illustrated embodiment comprise two thin-walled ribs that are attached to the base and the sides of the recess 102. The width of the ribs 104 decreases as they extend up the sidewalls of the recess 102 until the ribs 104 blend into the sidewalls completely. When the motor 18 is installed onto the rotary damper assembly, the thin ribs 104 are torn from the sidewalls as the motor travels down the recess (keyway) 102, until the motor 18 reaches its final installation depth, as shown in FIG. 15. When installed, the remainder of the rib material eliminates the axial play of the inner cylinder 100 within the outer cylinder 12.

Figure 9:
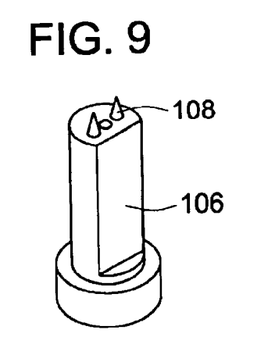
FIG. 9 depicts a motor output shaft with a crush rib feature in accordance with an embodiment of the present invention.

As seen in FIG. 9, in certain embodiments of the present invention, the motor output shaft 106 is provided with pre-loading spring pins 108 at the tip of the output shaft 106. The illustrated embodiment has two thin-walled fingers, or pins 108, that deform when the motor 18 is installed into the recess 102 of the inner cylinder 100. These spring pins 108 may be provided in addition to the crush ribs 104, or as an alternative to the crush ribs 104. In certain embodiments of the invention, the spring pins 108 are not provided on the motor output shaft 106.

In the embodiment of FIG. 1, the recess 47 is a "D" shape that provides a "D" style coupling between the motor 18 and the inner cylinder 14 to provide the rotational drive. However, in order to mitigate the issues of tolerance stack up between the motor, the inner cylinder, and the outer housing when assembled, the clearance between the motor output shaft 106 and the inner cylinder recess 47 may be increased in the embodiment of FIG. 1. However, such an increase in the tolerances of a "D" style coupling allow the motor shaft to rotate slightly before engaging with the inner cylinder recess 47. This in turn provides a lateral force on the inner cylinder 14, causing it to shift from its concentric location relative to the outer housing 12. The inner cylinder 14 then rubs along the inner circumference of the outer housing 12, causing it to shudder during its rotation. This is an undesirable side effect of diameter changes in the inner cylinder 14, as the increased clearance between the motor output shaft 106 and the inner cylinder recess 102 were needed to address tolerance stack up concerns.

Figure 8C:
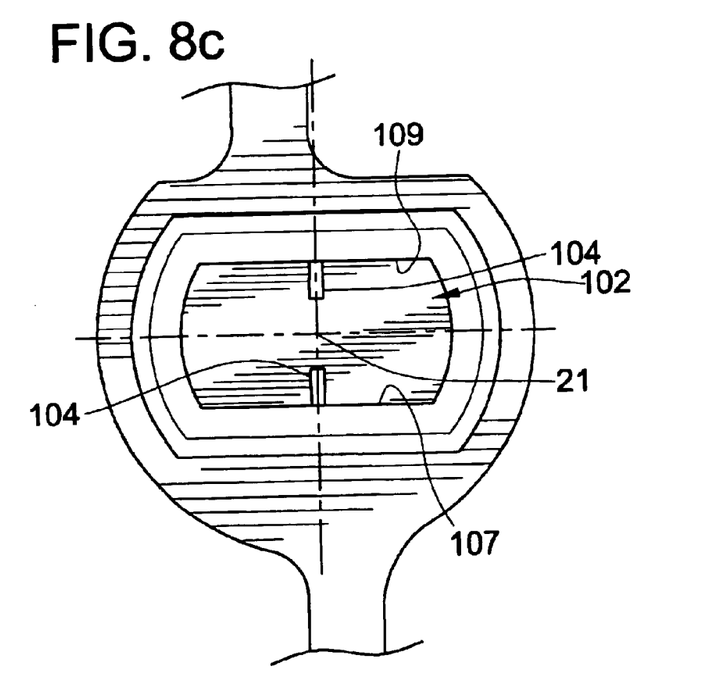
FIG. 8C is a top, enlarged view of a keyway attached to the inner cylinder in accordance with the embodiment of the present invention of FIG. 8B.
Figure 9A:
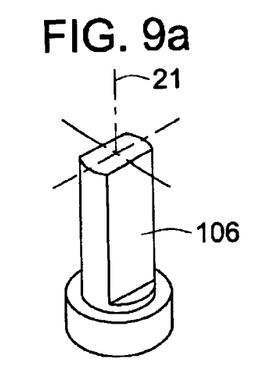
FIG. 9A depicts a motor output shaft with a symmetrical shape in accordance with an embodiment of the present invention.
Figure 16:
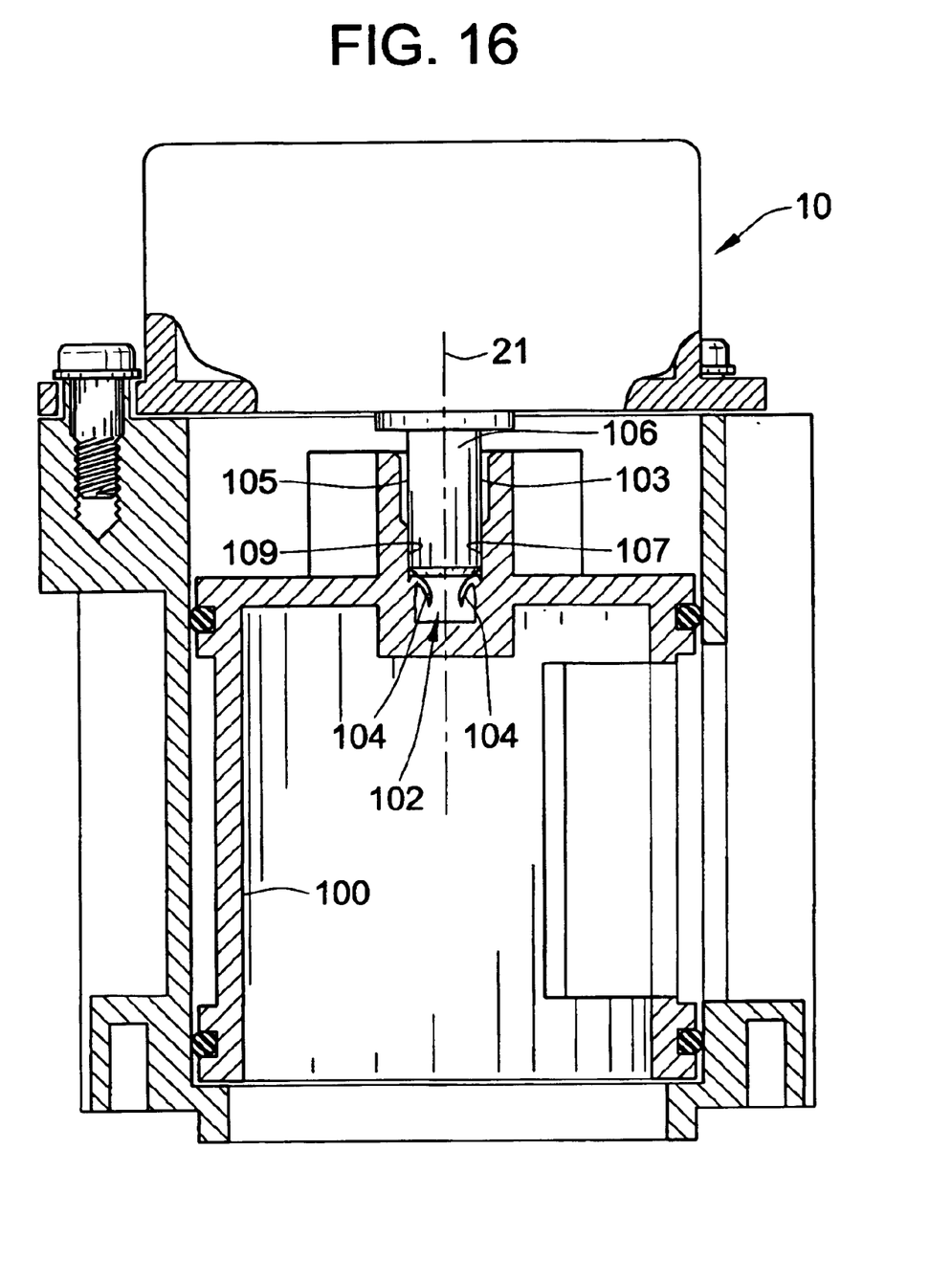
FIG. 16 is a partial cross-sectional view of the exemplary embodiment of the rotary damper assembly of FIG. 15, showing the manner in which the present invention allows the motor to float axially and radially with the inner cylinder, in relation to the outer cylinder.

The present invention addresses these concerns by providing a balanced design on the motor output shaft 106 and the inner cylinder recess 102 to assure that the forces exerted by the motor output shaft 106 on sidewalls 107, 109, diametrically disposed symmetrically about the longitudinal axis 21, as shown in FIGS. 8c, 15 and 16, of the inner cylinder recess 102 are balanced. This cancels out the net lateral effect, when combined with other changes. Hence, the present invention utilizes a double-flat paddle style output shaft of the motor, depicted in FIGS. 9A, and 14–16, having parallel flat sides 103, 105 diametrically disposed symmetrically about the longitudinal axis 21. The mating recess, including the double-flat sides 107, 109, is depicted as recess 102 in FIGS. 8A–8C and 14–16. Although a double-flat design is described as an exemplary embodiment, other embodiments with designs symmetrical about their axis of rotation will produce the balanced effect that is desirable. The embodiment of FIG. 9A is depicted without spring pins 108, but such spring pins 108 can be provided.

Figure 10:
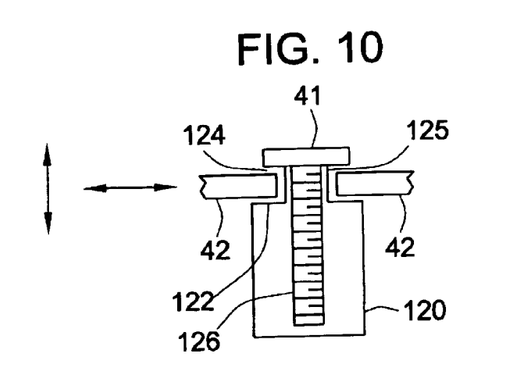
FIG. 10 is a side, cross-sectional view of a portion of the motor housing and mounting boss constructed in accordance with a first embodiment of the invention.

With closer fitting cylinders, such as provided by embodiments of the present invention, alignment of all components becomes much more critical in the design. However, due to the various manufacturing processes used for the components of the rotary damper assembly of the present invention, allowances need to be made to address a worst-case tolerance stack up scenario. To minimize the effect of misalignment between the motor and the inner cylinder, the motor is allowed to float at its mounting points in embodiments of the present invention. As depicted in FIG. 10, mounting elements, such as mounting bosses 120, are provided on the outer housing (or outer cylinder) 12. These mounting bosses 120 correspond to the anchors 44, 46 depicted in FIG. 1. Unlike the embodiment of FIG. 1, however, a small shoulder 122 is provided on the mounting boss 120 in the embodiment of FIG. 10. The flange 42 of the casing 31 rests on this shoulder 122 on the outer housing 12 (also known as the motor housing) when the motor 18 is assembled to the outer housing 12. The motor mounting hole 124 in the flange 42 has a first diameter that is large enough to allow a portion 125 of the mounting boss 120 to extend through the flange 42. As an example, the mounting hole 124 on the flange 42 is approximately 0.010 inches diametrically larger than the portion 125 of the mounting boss 120 that extends through it. Also, when installed, the portion 125 of the mounting boss 120 extends above the flange 42. Hence, the thickness of flange 42 is less than the height of the portion 125 of the mounting boss 120, so that the portion 125 protrudes above the flange 42 when installed. A fastener 41, such as a mounting screw, is then installed into the bore 126 in the mounting boss 120. The fastener 41 is fully engaged when it hits the extension 125 of the mounting boss 120. However, since the extension 125 protrudes above the flange 42 of the motor casing 31, the motor 18 is not locked down against the outer housing 12. The fastener head of the fastener 41 is large enough to prevent the motor 18 from becoming disengaged from the assembly.

Although depicted as mounting bosses 120, the mounting elements on the outer housing 12 are not bosses in other embodiments of the invention. Other types of mounting elements may be used to mount the motor on the outer housing 12, known to those of skill in the art.

Figure 11:
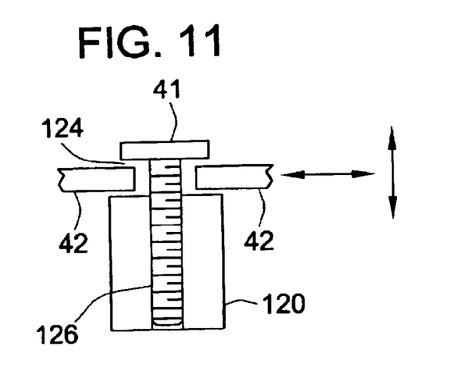
FIG. 11 depicts the motor housing and mounting boss constructed in accordance with a second embodiment of the invention.

In another embodiment of the invention, depicted in side view in FIG. 11, the depth of the screw hole 126 is controlled so that when assembled, the mounting screws 41 bottom out in the hole 126 before the motor 18 is tightly secured. Hence, there is a clearance between the bottom of the fastener head on the fastener 41 and the flange 42. In such embodiments, a shoulder 122 and extension 125 are not needed.

Figure 12A:
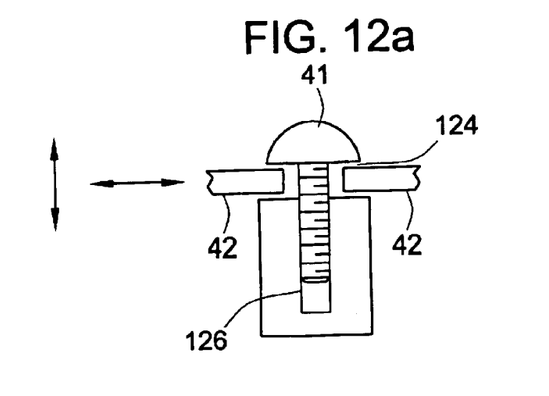
FIG. 12A depicts a third embodiment of the motor housing and mounting boss.
Figure 12B:
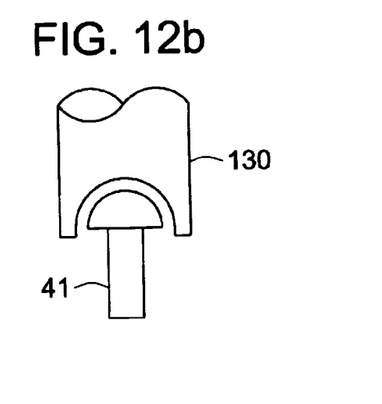
FIG. 12B schematically depicts the mounting of the fastener in the embodiment of FIG. 12A in accordance with an embodiment of the present invention.

FIG. 12A depicts another embodiment of the present invention in which a push-in type of mounting screw is used as a fastener 41. This type of screw is employed instead of a thread-cutting screw. A press using a specially-formed anvil 130, such as depicted in FIG. 12B, installs the fasteners to a controlled depth into the mounting boss 120 of the outer housing 12. The depth of the fastener is controlled to prevent it from tightly securing the motor 18 to the outer housing 12.

Figure 13:
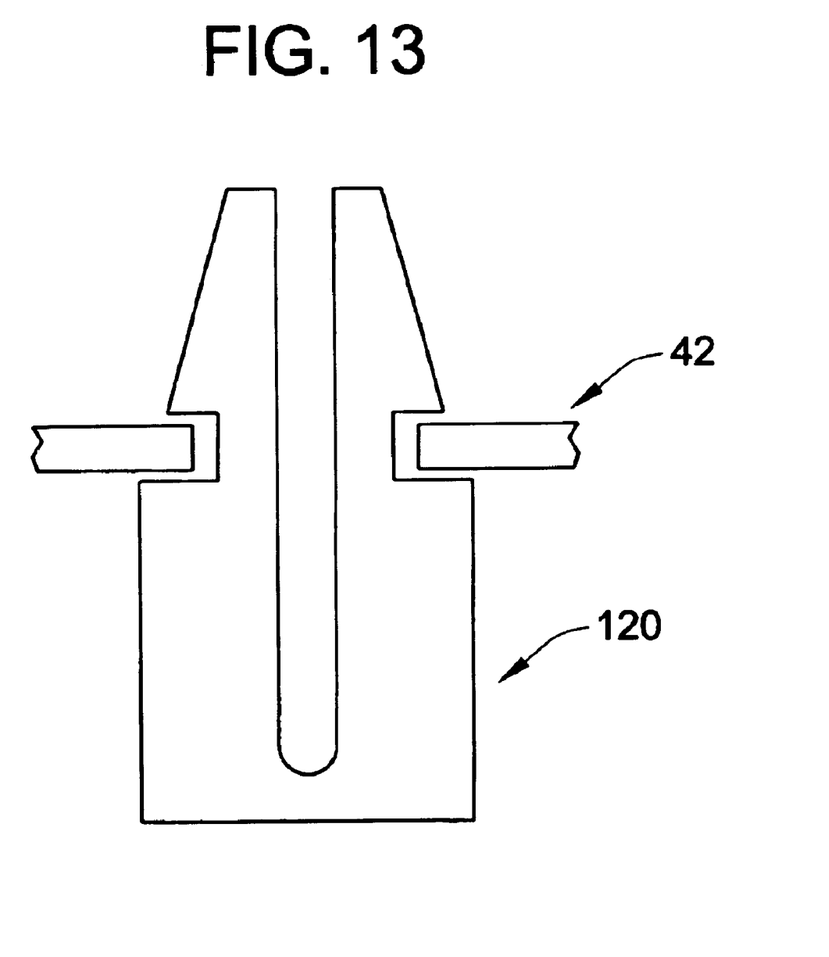
FIG. 13 is a schematic depiction of an exemplary embodiment of a snap-fit connection in accordance with certain embodiments of the invention.
Figure 14:
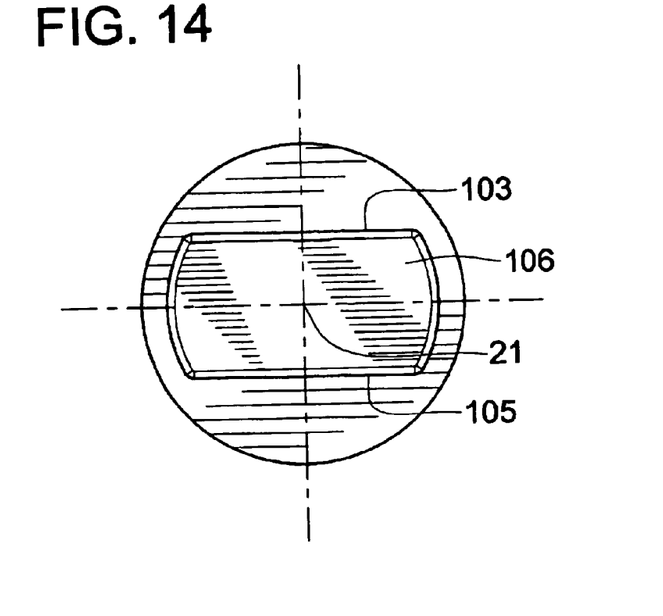

In other embodiments, not depicted, snap-fit features are molded onto the mounting bosses 120 of the outer housing 12. The holes 124 in the flange 42 of the motor casing 31 are then snap-fit features. The profile of this snap-fit prevents the motor from becoming detached from the assembly, but does not hold it tightly to the outer housing 14, allowing the motor 18 to float on the snap-fits. Snap-fits are well known to those of ordinary skill in the art of fasteners, and many different configurations may be employed. An exemplary snap-fit connection is depicted in FIG. 13.

The resulting assembly allows the motor 18 to float a small amount both radially and axially, as shown in FIG. 16 and as indicated by the arrows in FIGS. 10–12B. The radial clearance is a result of the difference in diameters between the motor mounting hole 124 and the outer diameter of the extension 125 or the mounting screw (fastener) 41. The axial clearance is a result of the difference between the motor mounting plate thickness (flange) 42 and the outer housing shoulder height or the underside of the screw head of the fastener 41. The axial clearance also relieves the axial force produced by the crush ribs 104 described above. If not relieved, the axial force can result in the axial faces rubbing together and producing a squeaking noise during operation. The axial clearance generated from the floating of the motor removes the potential for squeaking, while not greatly affecting the leakage of the unit.

In certain embodiments of the invention, the potential for squeaking to develop between the flat axial faces of the inner cylinder 100 and the outer housing 14 may be further reduced by texturing the face of the inner cylinder 100. This reduces the effect of surface area of the flat face, thereby reducing the frictional forces generated. Furthermore, a textured face helps retain a lubricant used between the inner cylinder and the outer housing of the damper. Methods of texturing of a face are known to those of ordinary skill in the art.

The provision of a motor mounting arrangement that allows a motor to float on the outer cylinder or outer housing, enables a clearance between the inner cylinder and the outer housing to be reduced, thereby reducing potential leakage when the rotary damper is in a closed position. This addresses a worst-case tolerance stack-up scenario and minimizes the effect of misalignment between the motor and the inner cylinder.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. Apparatus for regulating flow of fluid received from a fluid source, comprising:
   an inner cylinder with an inlet aperture and an outlet aperture;
   an outer cylinder with an inlet aperture and an outlet aperture, the inner cylinder nested within the outer cylinder and rotatable with respect to the outer cylinder to control an amount of registration of the outlet apertures of the inner cylinder and the outer cylinder to thereby regulate flow of fluid through the apparatus;
   a motor coupled to the inner cylinder and actuable to rotate the inner cylinder with respect to the outer cylinder; and
   a motor mounting arrangement configured to mount the motor to the outer cylinder in such a manner that the motor and inner cylinder float a small amount both radially and axially within the motor mounting arrangement in relation to the outer cylinder.

2. The apparatus of claim 1, wherein the motor mounting arrangement includes mounting elements mounted on the outer cylinder, and a flange on the motor, the flange having motor mounting holes with a first diameter.

3. The apparatus of claim 2, wherein the mounting elements are snap-fit connections.

4. The apparatus of claim 1, wherein the mounting elements are mounting bosses.

5. The apparatus of claim 4, wherein the mounting bosses include bores, and the motor mounting arrangement includes fasteners extending through the motor mounting holes of the flange into the bores of the mounting bosses to secure the motor to the outer cylinder.

6. The apparatus of claim 5, wherein the fasteners have fastener heads at one axial end of the fasteners, the fasteners protruding from the bores with a clearance between the fastener head and the flange such that the motor housing is coupled to the outer cylinder with axial play.

7. The apparatus of claim 6, wherein the fasteners have a second diameter that is less than the first diameter, such that the motor housing is coupled to the outer cylinder with radial play.

8. The apparatus of claim 6, wherein the mounting bosses have an axially extending portion and a laterally extending shoulder, an interior of the axially extending portion forming part of the bore, the axially extending portion having an outer diameter that is less than the first diameter of the motor mounting holes and greater than the second diameter of the fasteners, wherein the flange is mounted with the axially extending portions of the mounting bosses within the motor mounting holes of the flange.

9. The apparatus of claim 8, wherein the axially extending portion has a height above the shoulder that is greater than a thickness of the flange, such that the clearance is created between the fastener head and the flange when the fastener is fully inserted into the bore.

10. The apparatus of claim 6, wherein the bores have a first length, and the fasteners have an axial portion with a second length, wherein the second length is greater than the first length and a thickness of the flange combined, such that the fasteners extend out of the bore by an amount sufficient to form the clearance between the fastener heads and the flange.

11. The apparatus of claim 6, wherein the fasteners are push-in mounting screws, and wherein said screws are pushed into the bore such that the push-in mounting screws extend out of the bore by an amount sufficient to form the clearance between the fastener heads and the flange.

12. The apparatus of claim 6, wherein the inner cylinder includes a recess and the motor includes a motor output shaft that is received in the recess to couple the motor to the inner cylinder and rotate the inner cylinder.

13. The apparatus of claim 12, wherein the motor output shaft and the recess have corresponding cross-sections, each cross-section being balanced about a longitudinal axis extending perpendicularly and centrally through the cross-section.

14. The apparatus of claim 13, wherein the cross-section of the motor output shaft has at least one pair of parallel opposing sides disposed on opposite sides of the longitudinal axis.

15. The apparatus of claim 14, wherein at least one of the recess or the motor output shaft has elements that are deformable upon insertion of the motor output shaft into the recess.

16. The apparatus of claim 15, wherein the elements are crush ribs that extend along interior walls of the recess.

17. The apparatus of claim 15, wherein the elements are spring pins that extend from one end of the motor output shaft.

18. The apparatus of claim 12, wherein at least one of the recess or the motor output shaft has elements that are deformable upon insertion of the motor output shaft into the recess.

19. A rotary damper assembly comprising:
  an inner cylinder with an inlet aperture at one axial end, a sidewall with an outlet aperture in the sidewall, and a motor coupling element at another axial end;
  an outer cylinder with an inlet aperture at one axial end, and a sidewall with an outlet aperture on the sidewall, wherein the inner sidewall is nested and rotatable within the outer cylinder to control an amount of registration of the outlet apertures at the inner cylinder and the outer cylinder to thereby regulate flow of fluid through the apparatus;
  a motor engaged in a driving manner with the motor coupling element; and
  a motor mounting arrangement that includes:
    mounting bosses on the outer cylinder, each mounting boss having a bore configured to receive a fastener;
    a motor housing on the motor, the motor housing having a flange with motor mounting holes with a first diameter, the motor housing being mounted on the mounting bosses; a fastener extending through the motor mounting holes and into each bore, the fasteners having a second diameter and a fastener head;
  wherein the first diameter is greater than the second diameter such that the motor housing is coupled to the outer cylinder with radial play whereby the motor can float in a radial direction with the inner cylinder, in relation to the outer cylinder; and
  wherein the fasteners protrude from the bores with a clearance between the fastener head and the flange such that the motor housing is coupled to the outer cylinder with axial play whereby the motor can float in an axial direction with the inner cylinder, in relation to the outer cylinder.

20. Apparatus for regulating flow of fluid received from a fluid source, comprising:
  an inner cylinder with an inlet aperture and an outlet aperture;
  an outer cylinder with an inlet aperture and an outlet aperture, the inner cylinder nested within the outer cylinder and rotatable with respect to the outer cylinder to control an amount of registration of the outlet apertures of the inner cylinder and the outer cylinder to thereby regulate flow of fluid through the apparatus;
  a motor coupled to the inner cylinder and actuable to rotate the inner cylinder with respect to the outer cylinder, wherein the inner cylinder includes a recess and the motor includes a motor output shaft that is received in the recess to couple the motor to the inner cylinder and rotate the inner cylinder, the motor output shaft and the recess having corresponding cross-sections, each cross-section being balanced about a longitudinal axis extending perpendicularly and centrally through the cross-section; and
  a motor mounting arrangement configured to mount the motor to the outer cylinder such that the motor and inner cylinder can float radially and axially within the outer cylinder.

21. The apparatus of claim 20, wherein the cross-section of the motor output shaft has at least one pair of parallel opposing sides disposed on opposite sides of the longitudinal axis.

* * * * *